Patented May 9, 1933

1,908,154

UNITED STATES PATENT OFFICE

HENRY JORDAN, OF WILMINGTON, DELAWARE, ASSIGNOR TO E. I. DU PONT DE NEMOURS & COMPANY, OF WILMINGTON, DELAWARE, A CORPORATION OF DELAWARE

AZO DYE AND PROCESS OF MAKING SAME

No Drawing.    Application filed August 30, 1929.    Serial No. 389,610.

This invention relates to new disazo dyes for cotton, wool, silk, rayon, viscose, etc., and to the method of preparing the same. More particularly it is concerned with yellow to orange to brown disazo dyes having the following general formula

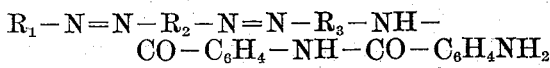

$R_1$, $R_2$ and $R_3$ meaning aromatic radicals of the benzene or naphthalene series not containing a free hydroxyl- or amino-group, the whole complex containing at least two acid groups adapted to form a salt.

These dyes are obtained by coupling a diazo compound of the benzene or naphthalene series without a free hydroxyl- or amino-group to an amino compound of the benzene or naphthalene series containing only one free amino-group and no hydroxyl-group, and having a free para-position to the amino-group, diazotizing the aminoazo-compound and coupling it again to an amino compound of the benzene or naphthalene series containing only one free amino-group and no hydroxyl-group, and having a free para-position to the amino-group, then condensing the amino-disazo compound with nitro-benzoyl chloride, reducing the nitro-benzoyl compound, condensing the resulting amino-benzoyl compound again with nitro-benzoyl chloride and finally reducing the nitrobenzoyl-amino-benzoyl compound again to form the amino-benzoyl-amino-benzoyl-amino-disazo compound.

These new dyes, having a free amino-group, may be diazotized and developed on the fiber to yield dyeings of an exceptionally high fastness to washing.

The new dye compounds and their preparation are disclosed in the following examples of actual embodiments of the process. It is to be understood that these examples are furnished by way of illustration only and that the details of the procedure specified therein as well as the particular proportions, reagents, temperatures, etc., are susceptible of variation and substitution.

Example 1

303 parts of 2-naphthylamine-6:8-disulfonic acid are diazotized in the usual way. To the diazo compound there is added a solution of 107 parts of meta-toluidine in 2000 parts of water and 120 parts of 31% hydrochloric acid solution. The mineral acid reaction of the coupling is neutralized with sodium acetate. The coupling is allowed to stir at 20–25° C. for about four to five hours, when it will be found to be complete. After acidifying with hydrochloric acid the aminoazo compound is salted out and filtered. The paste is stirred up with 4000 parts of water, dissolved with 50 parts of sodium hydroxide, then acidified with 350 parts of hydrochloric acid and diazotized with 69 parts of sodium nitrite at 15°–20° C. After forty to fifty minutes agitation the diazo compound will be complete. Again there is added a solution of 107 parts meta-toluidine to the diazo compound, the mineral acid reaction being neutralized again with sodium acetate. This coupling will be found to be complete after one and one-half to two hours stirring at 20°–25° C. The amino-disazo dye is salted out and filtered. The paste is dissolved with 5000 parts of water and 60 parts of sodium carbonate. The solution is heated to 65°–70° C., 53 parts of sodium carbonate are added, and while rapidly stirring, 186 parts of para-nitro-benzoyl chloride are slowly added to the solution.

The nitro-benzoyl compound will partly precipitate, and is fully precipitated by the addition of salt. After filtering, the paste is stirred up again with 6000 parts of water, heated to about 70° C., and is reduced by a solution containing 84 parts of sodium hydrosulfide (NaHS). The amino-benzoyl compound shows a better solubility than the nitro compound and will be almost completely in solution when the reduction is finished. It is easily distinguished from the nitro compound by its ability of forming a diazo compound. The amino-benzoyl compound is salted out and filtered. The paste is dissolved with 6000 parts of water at 65°–70° C., 53 parts of sodium carbonate are added and again, while stirring rapidly, 186 parts of para-nitro-benzoyl chloride are slowly added. The nitro-benzoyl-amino-benzoyl compound is mostly precipitated out; the reaction is made distinctly alkaline with sodium carbonate, about 300 parts of salt are added and the condensation product is filtered. The paste is stirred up with about 8000 parts of water, heated to 80°–82° C., and reduced with a solution containing 84 parts of sodium hydrosulfide. The amino-benzoyl-amino-benzoyl product will be in solution when the reaction is complete. It is salted out and filtered.

In its dry, ground form the new dye is an orange powder, soluble in water with a bright yellow coloration; in concentrated sulfuric acid with a bright reddish-orange coloration. It has a very high tinctorial power for cotton, wool, silk, and rayon, but leaves acetyl cellulose white. It dyes these fibers in bright yellow shades. The dyeings may be diazotized on the fiber and developed with various developers; beta-naphthol yielding a bright orange of extremely good fastness to washing and to light; phenyl-methyl-pyrazolone yielding a bright yellow of similar properties. The dyeings will discharge white with sodium hydrosulfite.

The new dye has most probably the following formula:

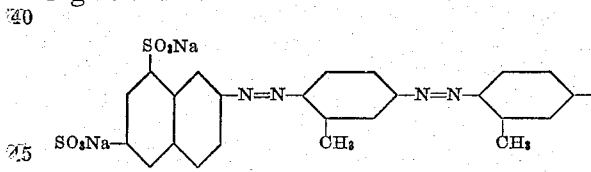

Substituting m-nitro-benzoyl chloride for p-nitro-benzoyl chloride in both condensations, a dye is obtained which on direct dyeings shows about the same shade as the para-product, but the beta-naphthol developed dyeings giving yellower and browner shades.

*Example 2*

173 parts of metanilic acid are diazotized in the usual way. The diazo compound is added to a solution of 223 parts of 1-naphthyl-amine-7-sulfonic acid in 2000 parts of water and 53 parts of sodium carbonate, to which have been added, before the coupling, 280 parts of sodium acetate. The temperature of the coupling should be 15°–20° C. After one hour's stirring the coupling will be complete. It is made alkaline with sodium carbonate, salted out and filtered. The paste is stirred up with 5000 parts of water, acidified with 320 parts of a 31% hydrochloric acid solution and diazotized at 15°–20° C. with 69 parts of sodium nitrite. After one hour's stirring the diazo compound will be complete and there is then added to it a solution of 107 parts of meta-toluidine in 2000 parts of water and 120 parts of a 31% hydrochloric acid solution. The mineral acidity of the coupling is neutralized with sodium acetate. After two hours' stirring at 20–25° C. the coupling will be complete. The amino-disazo dye is salted out and filtered. The condensation, reduction, second condensation and second reduction are carried out in a similar way as described in Example 1, but the temperature of both reductions may be reduced to 70–75° C. in this case.

The new dye in its dry, ground form is a reddish-brown powder, soluble in water with an orange coloration; in concentrated sulfuric acid with a bluish-green coloration. It dyes the different fibers in full orange-brown shades, which developed with beta-naphthol turn redder, stronger; with pyrazolone much yellower and stronger, yielding thus a bright yellowish-brown. The other properties of this new dye are similar to those in Example 1.

The new dye has most probably the following formula:

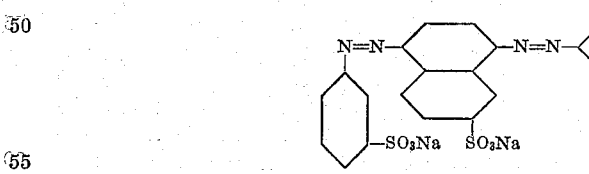

Obviously in place of the diazo compounds already mentioned in the examples as suitable for use as first components, other diazo compounds of the benzene or naphthalene series which do not contain either a free amino or a free hydroxy group may be employed. As examples of such compounds may be mentioned: aniline, toluidine, xylidine, anisidine, aniline-disulfonic acid, the various toluidine-, xylidine-, and anisidine-sulfonic acids, alpha- and beta-naphthylamine and their mono- or di-sulfonic acids, also amino-benzene or amino-naphthalene-carboxy acids, etc.

Similarly, other compounds than those illustrated may be employed as first coupling components. Thus, for example, instead of the compounds given in the examples ortho-anisidine, ortho-toluidine, para-xylidine, aniline (coupled as omega-methane-sulphonic acid), cresidine, alpha-naphthylamine, etc., may be employed.

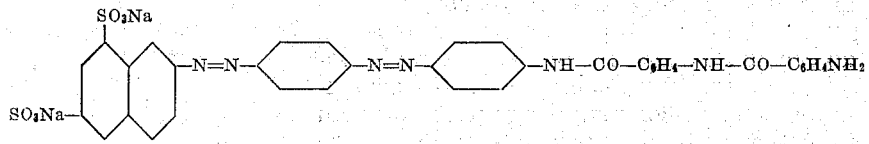

The same coupling components may be employed as second coupling components as employed for first coupling components.

The shades of the new dyes vary, according to the different components used, from yellow to orange to brown. The new dyes will dye wool, cotton, silk, rayon, and viscose equally well. The dyes show a very good fastness to washing and an excellent fastness to light. They are not sensitive to alkali and acid and discharge white with hydrosulfite.

As many apparently widely different embodiments of this invention may be made without departing from the spirit thereof, it is to be understood that I do not limit myself to the foregoing examples or description except as indicated in the following claims.

I claim:

1. A dye compound having the general formula $$R_1-N=N-R_2-N=N-R_3-NH-CO-C_6H_4-NH-CO-C_6H_4NH_2$$

wherein $R_1$, $R_2$ and $R_3$ represent aromatic radicals of the benzene or naphthalene series not containing a free hydroxyl or amino group and wherein the complex $$R_1-N=N-R_2-N=N-R_3$$

contains at least two acid groups adapted to form a salt.

2. The dyestuff of claim 1 wherein at least one of $R_1$ and $R_2$ represents the residue of a naphthalene sulfonic acid.

3. The dyestuff of claim 1 wherein the complex $R_1-N=N-R_2$ contains at least two acid groups adapted to form a salt.

4. A disazo dye having the following formula

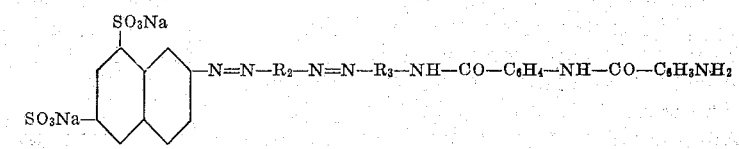

wherein $R_2$ and $R_3$ represent phenyl radicals not containing a free hydroxyl or amino group.

5. A disazo dye having the following formula

wherein the aryl radicals may contain alkyl substituents said dye being an orange powder soluble in water with a bright yellow coloration in concentrated $H_2SO_4$ with a bright reddish-orange coloration and yielding a yellow to orange and brown shade when developed with beta-naphthol.

6. A dyestuff having the following general formula

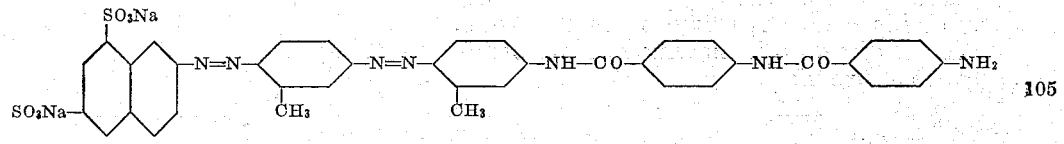

said dye being an orange powder, soluble in water with a bright yellow coloration, in concentrated sulfuric acid with a bright reddish-orange coloration, dyeing cotton a bright yellow and when diazotized on the fiber and developed with beta-naphthol yielding a bright orange shade.

7. The process of making a new dye which comprises coupling a diazotized monoazo compound of the benzene or naphthalene series containing no free hydroxyl or amino groups but containing at least two acid groups adapted to form a salt to an amino compound of the benzene or naphthalene series containing only one free amino-group and no hydroxyl-group, and having a free para-position to the amino-group, then condensing the amino-disazo compound with nitro-benzoyl chloride, reducing the nitro-benzoyl compound, condensing the resulting amino-benzoyl compound again with nitro-benzoyl chloride and finally reducing the nitro-benzoyl-amino-benzoyl compound again to form the amino-benzoyl-amino-benzoyl-amino-disazo compound.

8. The process of making a new dye which comprises diazotizing 2-naphthylamine-6:8-disulfonic acid, coupling with meta-toluidine to form an amino azo compound, diazotizing and coupling the diazo compound with meta toluidine, coupling the resulting amino disazo compound with nitro-benzoyl chloride, reducing the nitro group, coupling the resulting amino-benzoyl compound again with nitro-benzoyl chloride and finally reducing the nitro-benzoyl-amino-benzoyl compound to form an amino-benzoyl-amino-benzoyl-amino disazo compound.

9. The process of making a new dye which comprises condensing an amino disazo compound, containing no free hydroxyl or amino groups but containing at least two acid groups adapted to form a salt, with nitro-benzoyl chloride, reducing the nitro-benzoyl compound, condensing the resulting amino-benzoyl compound again with nitro-benzoyl chloride, and finally reducing the nitro-benzoyl-amino-benzoyl compound again to form an amino-benzoyl-amino-benzoyl-amino disazo compound.

10. A disazo dye having the following probable formula

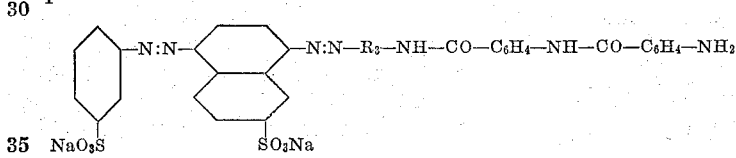

wherein $R_3$ represents a phenyl radical not containing a free hydroxyl or amino group.

11. A disazo dye having the following probable formula

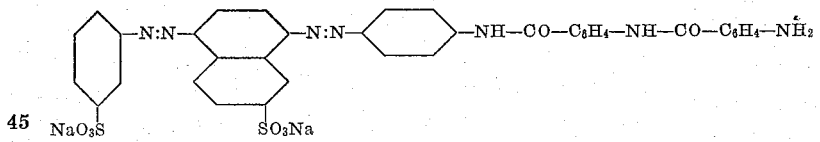

wherein the aryl radicals may contain alkyl substituents, said dye being a reddish-brown powder soluble in water with an orange coloration, in concentrated $H_2SO_4$ with a bluish-green coloration and yielding an orange-brown shade which becomes redder when developed with beta-naphthol.

12. A dyestuff having the following probable formula

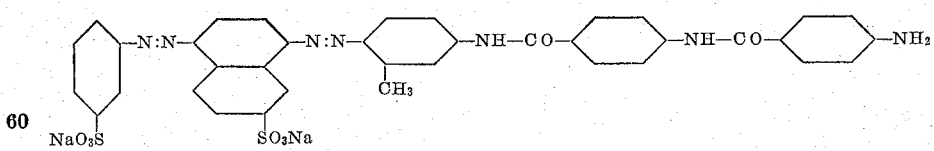

said dye being a reddish brown powder, soluble in water with orange coloration, in concentrated sulphuric acid with a bluish-green coloration, dyeing cotton an orange-brown shade and when diazotized on the fiber and developed with beta-naphthol becomes redder.

13. The process of making a new dye which comprises diazotizing metanilic acid, coupling with 1-naphthylamine-7-sulphonic-acid, diazotizing and coupling the diazo compound with meta-toluidine, treating the resulting amino-disazo compound with nitro-benzoyl-chloride, reducing the nitro group in the resulting compound, treating with nitro-benzoyl-chloride and finally reducing nitro-benzoyl-amino-benzoyl compound to form an amino-benzoyl-amino-benzoyl-amino-diazo-compound.

In testimony whereof, I affix my signature.

HENRY JORDAN.